June 3, 1952  C. N. BERGMANN  2,599,221
CONVEYER SYSTEM FOR RECEPTACLES FED TO FILLER MACHINES
Filed June 20, 1946  2 SHEETS—SHEET 1
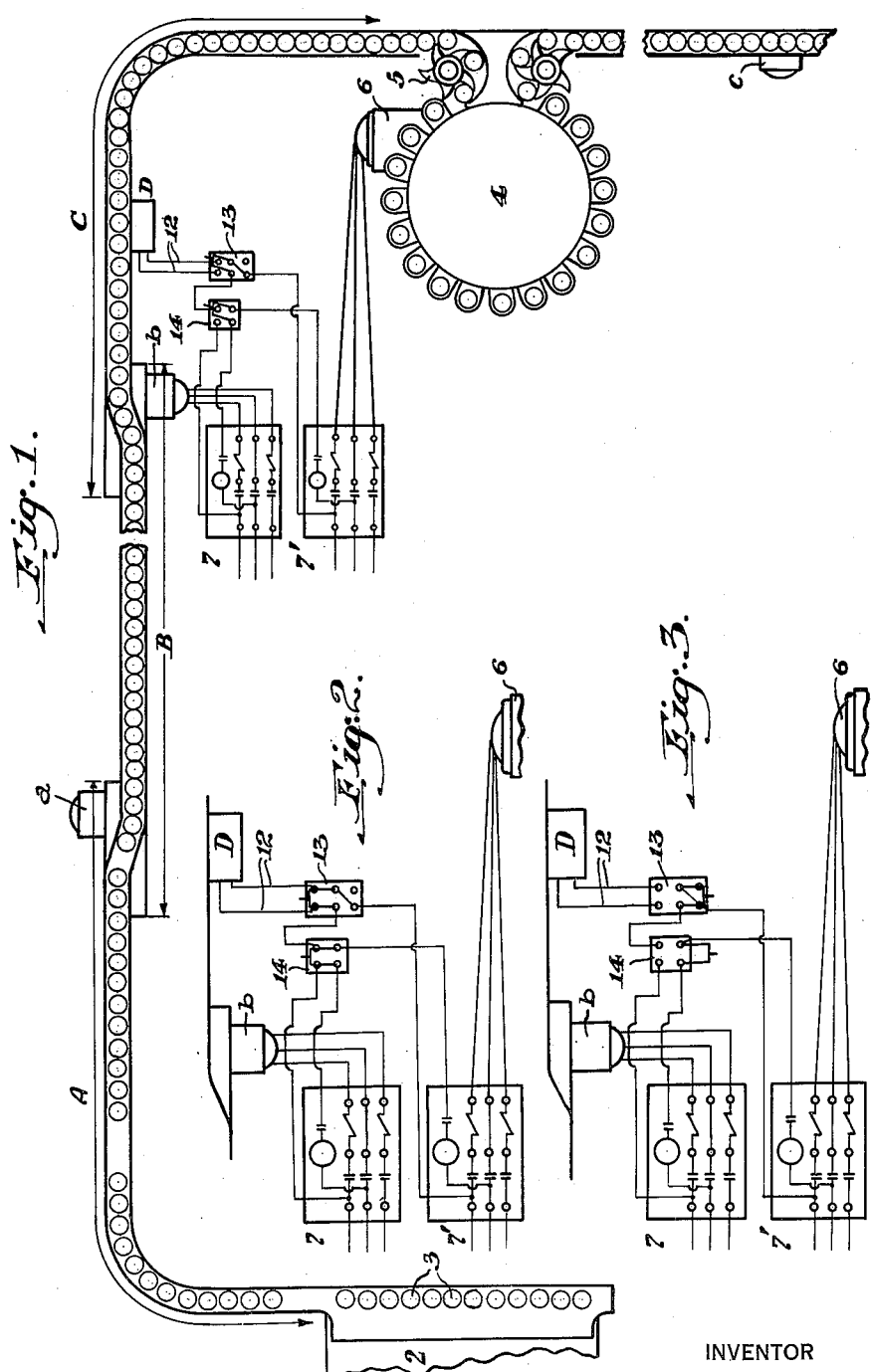
INVENTOR
CHRISTIAN N. BERGMANN.
BY
ATTORNEY June 3, 1952 C. N. BERGMANN 2,599,221
CONVEYER SYSTEM FOR RECEPTACLES FED TO FILLER MACHINES
Filed June 20, 1946 2 SHEETS—SHEET 2

INVENTOR
CHRISTIAN N. BERGMANN
BY
ATTORNEY

Patented June 3, 1952

2,599,221

UNITED STATES PATENT OFFICE 2,599,221

CONVEYER SYSTEM FOR RECEPTACLES FED TO FILLER MACHINES

Christian N. Bergmann, Pittsburgh, Pa., assignor of one-third to Charles M. Clarke, Sewickley, Pa.

Application June 20, 1946, Serial No. 678,108

6 Claims. (Cl. 198—34)

This invention is an improvement in the art of conveying receptacles, as milk bottles, from one station to another, as from a washer to a filler, under controlled progress and regulation, as hereinafter described. It is especially useful in the operation of dairy and similar installations, wherein such receptacles are usually made of glass, and has for one of its prime objects, control of bottle pressure and prevention of breakage.

It is a well known fact that in such operations, individual or several bottles of a conveyor-propelled column, are at times subjected to sufficient accumulating pressure to cause destructive contacts, resulting in breakage, serious loss of time, and of the bottles themselves.

My invention has in view to control and prevent excessive bottle pressure, and consists generally in utilizing a continuous series of conveyor sections, moving receptacle units, as bottles, from a receiving terminal to a delivery terminal, at varying speeds, and in connection with operation control elements for stopping and starting, under the prevailing conditions of operation.

In the particular installation utilized for illustion, an initial conveyor moves successively discharged bottles in interrupted groups or series, as twelve, more or less, when discharged from a bottle washer, onto a primary conveyor running at a suitable speed, to remove the bottles as received, prior to the next discharge from the washer.

The bottles carried on the intermediate conveyor, at suitably decreased speed, are closed together in a continuous column, in a secondary conveyor section. The bottles are then delivered to a third conveyor section, running at a sufficiently increased speed to initially cause them to be properly separated, to meet plant operating conditions.

Thereafter, the column proceeds towards the final receptive station, as in a filler assembly, in a partially separated and finally closely associated file, but not under sufficient pressure to cause breakage, with final delivery to the filler.

It is important that the bottles be delivered around the usual star wheel leading to the filler, in a continuous closely assembled column, and in synchronism with the speed of the filler.

One such installation, with its operation controlling elements and operative connections, is illustrated in the accompanying drawings, in which:

Fig. 1 is a general plan view showing the arrangement of the several conveyor sections, between a washer and a filler.

Fig. 2 is a wiring diagrammatic view showing the switches for the current supply circuit to the conveyor and the filler, both closed.

Fig. 3 is a similar view showing both switches open.

Fig. 6 is a partial view of a conveyor showing use with square bottles, or the like.

Figure 4:
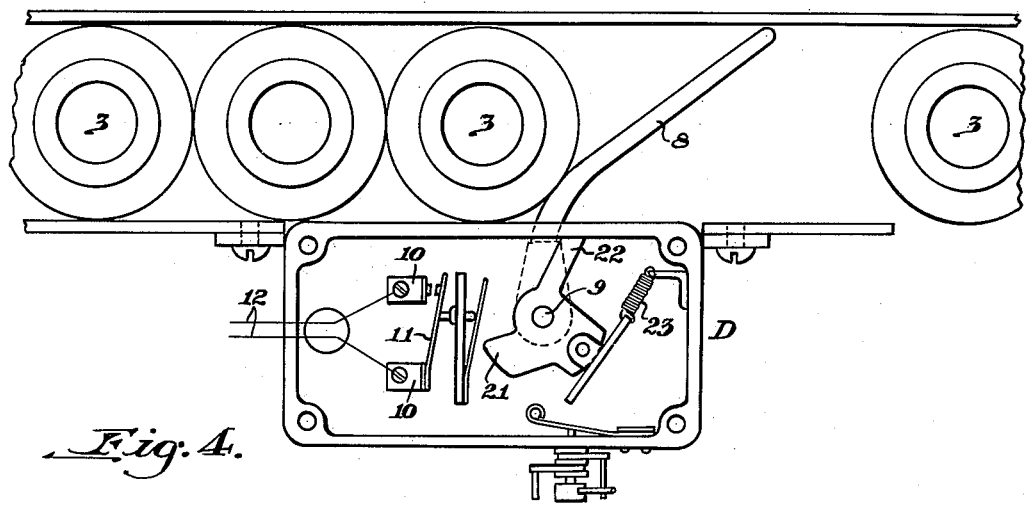
Fig. 4 is a plan view of an automatic control switch for current control of the power unit for energizing same to rotate the filler, in open position.

Referring to Fig. 1, the bottle washer 2 delivers series or groups of bottles 3, as twelve, more or less, successively to the receiving section A of an initial conveyor, driven by a standard power unit $a$, operating at a suitable speed, as say 50 feet P. M. more or less, to suit operating conditions.

Bottles of the first section are conveyed beyond the washer in groups, spaced apart as shown, in conformity with group delivery from the washer. Conveyor A delivers the bottles to an intermediate conveyor section B, of any suitable length, running at a relatively slower speed, as say 35 feet P. M., more or less.

The bottles on conveyor section B become closely assembled, as indicated, and move at substantially the speed of the conveyor, driven by variable speed drive unit $b$. The bottles are delivered from section B to the third section C, running at a faster speed, as say 50 feet P. M., more or less, and operated by standard power unit $c$.

Section C is of a length, between section B and the filler 4, to consistently receive bottles from section B and deliver them to the usual star wheel 5 of the filler, in a continuous contacting column, for regular and proper successive service.

Instead of drive unit $b$, any other suitable means may be employed to synchronize the speed of section B with the speed of the filler 4.

Because of the relatively increased speed of section C over that of section B, the bottles 3 are purposely somewhat separated upon entering section C, but will become closely assembled, with a desired degree of conveyor slippage, before engaging the star wheel 5.

The length of section C should be limited sufficiently to contain a moving column of contacting bottles, within a numerical factor of safety, throughout the length of the closely assembled column approaching the star wheel.

Such provision and arrangement, dependent on the character and kind of the units being conveyed, and subject to the speed limitations of the plant operating conditions, is a matter for the designing engineer, or others in charge of the installation.

It will thus be seen that the length of each conveyor section, and the speed of the conveyor chains, are dependent on the distance between the bottle washer and the filler, and on operation requirements.

As shown, and as hereinafter described, I provide means for starting and stopping the movement of conveyor chain section B, in unison with starting and stopping of the filler, by current supply control switches, as an emergency switch 14 and an automatic control switch 13.

The filler 4, and the B section conveyor chain drive units, are wired so that when the filler is operating on automatic control, the B section conveyor chain will not stop running when the filler is stopped automatically; but when the emergency switch is opened by the operator, then both the filler and the B conveyor section chain will stop at the same time.

Dependent upon various operating conditions, and independent of the automatic control, operation of the feed of the middle conveyor section B and filler 4 is entirely practicable by use of the emergency switch, alone, and independent of the automatic control.

Under such circumstances, with section B stopped, and with continuous operation of the conveyor section C by drive unit c, and of the filler motor drive 6, all bottles beyond the thus arrested section B, may be entirely absorbed by the filler, pending resumption of normal operation.

I show in Figs. 1, 2 and 3 circuit control diagrams for current supply to the variable speed drive unit b for conveyor section B, and to the automatic control attachment D for conveyor section C, respectively. Also, as in Figs. 4 and 5, construction and operation of automatic attachment D, for control of movement of the bottle units in approaching the filler 4.

Such atachment is designed for operation of a closing and opening switch, actuated by the units, as in my co-pending application, Ser. No. 670,820.

The wiring diagrams show a three phase 220 volt current supply, as at 7, for drive unit b, and as at 7', for the drive unit 6, of the filler 4.

Referring first to the unit controlled attachment D, it is provided with an arm 8, normally extended across the path of units 3, connected with a pivoting stem 9, under action of retracting spring 23 and limiting stop 22.

Secured to stem 9 is an abutment 21, operable by rotation of stem 9, to move spring arm 11 into closing connection between terminals 10, 10, to close the circuit between wires 12 leading to switch 13, and also connected with emergency switch 14.

Figure 5:
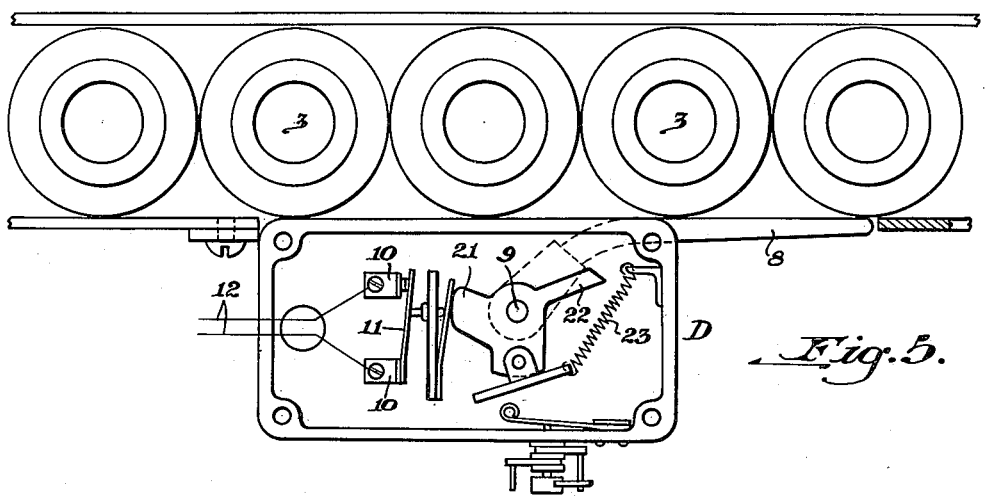
Fig. 5 is a similar view of the switch, in closed position.

With the arm 8 depressed backwardly as in Fig. 5, and both switches closed as in Fig. 2, any contacting series of units will continue to the end of conveyor section B.

However, in case of a material gap, as in Fig. 4, arm 8 is thrust across the conveyor pathway, by spring 23, opening the circuit through contacts 10, 10, and terminating flow of current through wires 12 and to the filler motor drive 6.

Upon sufficient accumulation of units 3 to depress arm 8 to the position of Fig. 5, the filler 4 will be operated, and feed of units to the filler will be resumed, with constant normal running of conveyor C.

In case of any emergency, such as upset or broken bottles, or any other cause for stopping the filler, emergency switch 14 may be opened by the operator, terminating current supply to drive unit b, and also to filler motor drive 6, stopping both at the same time.

Thereafter, feed of units may be resumed by again closing emergency switch 14 for regular supply to conveyor C, under regular normal movement from the washer, or until any further interruption, as described.

It will thus be seen that, entirely independent of the functioning of automatic control attachment D, the so-called automatic control, hand operation of switch 14 may be utilized to positively effect either stoppage or starting of the feed, and to definitely prevent any increase of bottle pressure, or jamming or breakage.

Normally, with switches 13 and 14 both closed, the filler will be operated and supplied through the automatic control attachment D during continuous operation of conveyor B, and conveyor B will not ordinarily stop when the filler is stopped by the automatic attachment. However, when the operator throws down the contact lever of switch 14, as in Fig. 3, conveyor B and filler 4 both will stop at the same time. Thereafter, neither conveyor B or filler 4 will start again automatically, until the operator closes switch 14.

By proper manipulation of hand operated switches 13 and 14, the operator can control the stopping and starting of both the conveyor section B and the filler, at the same time or independently or use of automatic control attachment D.

The detailed operation of my invention may now be followed. Starting at the star wheel 5 of the filling machine (sometimes called the filler or filler machine) it is always necessary that there be a few bottles in advance of the star wheel so that each arm of the star wheel in turn will separate the leading bottle on the conveyor C from the succeeding one. If any gap is allowed to form in the bottles at this point, the oncoming arm may be out of synchronism of the travel of the bottle and crush the bottle instead of going between two bottles. If the synchronism is destroyed by a gap occurring, several bottles may be broken by the star wheel feeder before the operator has a chance to correct the situation.

Therefore the function of the conveyor C is to feed the bottles to the star wheel and to see that there is always an accumulation in advance of the star wheel with several bottles back from the star wheel being in tight contact with one another. To assure this operation the conveyor C is driven by its motor at a speed greater than the speed at which the filling machine accepts the bottles. In other words, the conveyor C must slide under the bottles adjacent the star wheel feed and keep them crowded together. The pressure of bottles thus crowded together, however, must not be so great as to crush the bottles. Thus the conveyor B is operated at a speed slower than the conveyor C. This means that where the bottles move from B onto C they will be spaced a slight distance apart, and one will not press against the other until they reach the point where the crowding and contacting takes place in advance of the star wheel. The conveyor B, however, must operate at a speed approximately the same as the speed of the filling machine so that every time a bottle is fed into the filling machine from one end of the conveyor C, a bottle will be fed onto the conveyor C at its other end.

It so happens that the bottle washing machine 2 discharges groups of bottles, as for example 12 bottles, but there is a time interval between the discharge of each group. The conveyor A must operate fast enough to get a group of 12 bottles at station 3 in Fig. 1 out of the way before the next group of bottles is discharged by the washing machine onto the conveyor. This means that on the conveyor A the bottles are arranged in groups of 12 in the specific example mentioned, with a space between each group. Since conveyor A has a succession of bottles followed by a succession of spaces, it is driven at a speed faster than conveyor B. If, for example, conveyor B accepts 12 bottles a minute (an absurdly slow figure, used only for illustration) conveyor A might operate at a speed to deliver 14 bottles a minute to conveyor B, but since there is a space of 2 bottles between each group of 12 bottles on conveyor A, conveyor A will actually deliver only 12 bottles a minute to B. Therefore the gaps between the groups of bottles on conveyor A will be eliminated by conveyor B. This of course is essential to the proper operation of conveyor C and the filler machine.

It will also be seen from the foregoing explanation that the speed of C must be faster than the speed of B, and that the speed of A must be different from the speed of B. The speeds of A and C may be about equal, but do not need to be exactly equal.

Assume again that a bottle is broken in the washing machine, or if for some reason the washing machine fails to set down the expected number of bottles. Then there is a gap which may not be closed on conveyor B. If this gap were allowed to travel through to the star wheel, the isochronism might have been destroyed and the next bottle beyond the gap would then be broken by the star feeder, as would be succeeding bottles, until the operator could correct the situation.

Therefore the automatic switch is provided at D. If there is a gap of the extent of a bottle or so, the arm 8 (see Fig. 4) swings out into this gap and stops the oncoming bottles. Also it stops the filling machine and the parts are then in the position shown in Fig. 4. The stopping of the filling machine, however, does not stop the conveyors A and B, and bottles continue to feed onto the conveyor C, and they accumulate in back of the arm 8. When they accumulate to form a sufficient pressure, they will push the arm 8 to one side and start to close the gap. Since the conveyor C operates at a speed greater than the speed at which the filling machine accepts the containers, the oncoming group of bottles which have thus been caused to line up into contact with one another by the arm 8, catch up to the containers crowded together in advance of the filling machine. It must be kept in mind that when the arm 8 operates to obstruct the oncoming containers, it does not interrupt the travel of the conveyor C, but it stops only the filling machine.

It wil lbe recalled that when the bottles come from the conveyor B to the conveyor C, with the conveyor C traveling faster than B, a slight space develops between the bottles. Fig. 1 is of such small scale that it does not show too clearly this spacing. However, when the arm 8 holds back the oncoming containers, it closes up this space in advance of the point where it normally would perhaps be closed up, so that the gap caused by the broken bottle is compensated for and eliminated without ever getting near to the star wheel. The same operation will follow whether there is one bottle or several bottles in the gap produced at the washer. The arm 8 swings out just as soon as the gap begins, and it holds the bottles back until there are a predetermined number grouped together on the conveyor C in advance of the arm, and therefore whether one bottle is broken or whether there are five or six would make no difference.

Assume, however, that a bottle tips over or breaks in the filling machine. Then the operator must stop the filling machine. If the conveyor B continued to operate, this would cause more bottles to be crowded together on the conveyor C than might be safely accepted without a bottle being crushed. Therefore the emergency switch 14 is provided so that whenever the filler machine is stopped because of some condition on the filler machine, as distinguished from it being stopped by the operation of the arm 8, the conveyor B will also stop. In other words conveyor B does not stop when the arm 8 causes the filler machine to stop, because in this case it is desirable to keep up the feed of the bottles to close a gap, but when the filler machine stops with the bottle condition normal on the conveyor C, conveyor B also stops and does not disturb the normal condition of bottles on C. The stopping of B does not affect the conveyor A as there is always enough slack space between groups of bottles to take up for temporary shut-downs of this character. It will be understood in Fig. 1 that the elements of the combination are shown but the conveyors normally will be much longer.

Figure 6:
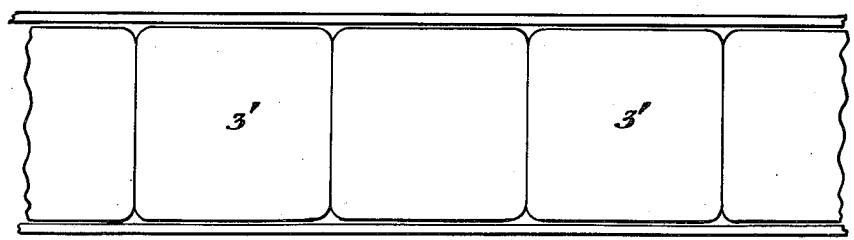

I show also in Fig. 6 a series of square units 3', in close assembly progress conveyor movement. Such rectangular, or other polygonal shape bottles, are now in common use for milk, cream, or other liquids, and are likewise subject to the same control without material modification of the moving and control equipment above described. Likewise, rectangular boxes, crates, cartons, and the like may be handled with the same facility and economy, with suitable speed regulation.

The construction and operation of the invention will be readily understood and appreciated by all those familiar with the practice of transferring bottles, especially in the dairy industry, or others concerned with the movement of various other container units in series, as described.

The essential result secured by the conveyor assembly, and contributary controls, is that throughout the progress of conveyor propelled units—as in the present case from the washer to the filler—there is maintained between series of progressing units, a desirable synchronism of operation contributing to elimination of excessive bottle pressure and avoidance of less than complete and satisfactory final delivery to the filler.

It will be understood that the system may be varied or modified in various details, arrangement, or otherwise to adapt it to the particular plant layout, or industry involved, or otherwise, within the scope of the following claims.

I claim:

1. In combination with an independently driven permanent adjusted speed first conveyor section receiving spaced apart groups of bottles as from a washer, communicating with a variable speed regulated second conveyor section running at slower speed than said first section to effect spacing closure of bottles, said second section communicating with an independently driven permanently adjusted faster speed third conveyor section primarily effecting initial partial separation of bottles and final unit-to-unit contact with limitation of bottle pressure and continuous contact upon delivery to a filler, a motor drive for the filler, a control switch for the filler motor, a variable speed drive motor for the second conveyor, an automatic control device mounted adjacent the third conveyor section for stopping separated bottles and grouping them together before they are released to pass the automatic control device and close the circuit control switch which stops and starts the filler automatically in synchronism with the adjusted speed of the conveyor sections and bottle delivery to the control device.

2. In a system for supplying containers to a filler machine or the like wherein the filler is provided with a motor for driving the same, a conveyor for delivering containers to the filler, driving means for the conveyor independent of the driving means for the filler, a second conveyor having a discharge end arranged to discharge onto the receiving end of the first conveyor, means for driving the second conveyor independently of the first conveyor at a speed at least equal to the speed of the filler machine but lower than the speed of the first conveyor, and a third conveyor for receiving bottles from a washer having a discharge end arranged to discharge containers onto the receiving end of the second conveyor, means independent of the other two conveyors and the filler machine for driving the third conveyor at a speed greater than the speed of the second conveyor.

3. The system defined in claim 2 wherein bottle controlled means are arranged along the first conveyor between the filler machine and the second conveyor for automatically stopping the filler machine when a gap in the supply of containers is encountered on the first conveyor, and for starting the filler machine when a predetermined number of bottles has accumulated in advance of said bottle controlled means.

4. In a system as defined in claim 2, a spring-biased arm movable across the first conveyor when a gap in the succession of the containers moving to the filler machine is encountered, and which may be moved from a position substantially clear of the containers by the pressure of an accumulated succession of containers on the conveyor in advance of said arm, switch means operated by the arm for stopping the filler machine when the arm moves across the conveyor and for starting the filler machine when the arm is pushed back by an accumulation of oncoming containers.

5. The system as defined in claim 2 wherein there is an emergency means separate from the bottle controlled means for simultaneously stopping the filler machine and the second conveyor.

6. The system as defined in claim 3 wherein there is a second manually controlled switch through which said first switch is effective for simultaneously stopping or starting the filler machine and the second conveyor.

CHRISTIAN N. BERGMANN.

REFERENCES CITED

The following references are of record in the file of this patent:

UNITED STATES PATENTS

| Number | Name | Date |
| --- | --- | --- |
| 1,457,353 | Dreher | June 5, 1923 |
| 1,942,555 | Kimball et al. | Jan. 9, 1934 |
| 1,970,574 | Pelosi | Aug. 21, 1934 |
| 2,015,187 | Mayer | Sept. 24, 1935 |
| 2,026,856 | Youngdahl | Jan. 7, 1936 |
| 2,285,267 | Gantzer | June 2, 1942 |
| 2,368,738 | Bergmann | Feb. 6, 1945 |